US012654290B2

(12) United States Patent
Wueste

(10) Patent No.: US 12,654,290 B2
(45) Date of Patent: Jun. 16, 2026

(54) BIT ATTACHMENT DEVICE AND TIGHTENING MODULE

(71) Applicant: ATLAS COPCO INDUSTRIAL TECHNIQUE AB, Stockholm (SE)

(72) Inventor: Michael Wueste, Wesel (DE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 453 days.

(21) Appl. No.: 17/922,730

(22) PCT Filed: May 6, 2021

(86) PCT No.: PCT/EP2021/062021
§ 371 (c)(1),
(2) Date: Nov. 1, 2022

(87) PCT Pub. No.: WO2021/224402
PCT Pub. Date: Nov. 11, 2021

(65) Prior Publication Data
US 2023/0166388 A1 Jun. 1, 2023

(30) Foreign Application Priority Data
May 7, 2020 (CN) ........................ 202020733213.6

(51) Int. Cl.
*B25B 23/00* (2006.01)
*B25B 21/00* (2006.01)
*B25B 21/02* (2006.01)

(52) U.S. Cl.
CPC .............. *B25B 21/00* (2013.01); *B25B 21/02* (2013.01); *B25B 23/0035* (2013.01)

(58) Field of Classification Search
CPC ..... B25B 21/00; B25B 21/02; B25B 23/0035; B25B 23/04; B25B 23/0007
(Continued)

(56) References Cited

U.S. PATENT DOCUMENTS 2,262,075 A * 11/1941 Wilhide .................. B24B 15/00 451/430
3,069,875 A * 12/1962 Crum, Jr. ................ F16D 1/101 464/169
(Continued)

FOREIGN PATENT DOCUMENTS

CN 110253478 B * 1/2024 ............. B25B 21/00
DE 102015113682 A1 * 2/2017 ......... B25B 23/0035
(Continued)

OTHER PUBLICATIONS

Atlas Copco Industrial Technique AB, International Patent Application No. PCT/EP2021/062021, International Preliminary Report on Patentability, Apr. 14, 2022.
(Continued)

*Primary Examiner* — Robert F Long
(74) *Attorney, Agent, or Firm* — Moore & Van Allen PLLC; W. Kevin Ransom

(57) ABSTRACT

Provided is a bit attachment device comprising an attaching sleeve, a disassembling-attaching assembly and an abutting assembly arranged in sequence. A first end of the attaching sleeve is attached to a movable rod within the tightening module via a buffer assembly to synchronize movement with the movable rod. A first end of an attaching shaft of the disassembling-attaching assembly forms a tight fit with a second end of the attaching sleeve via a spline structure, and the second end is attached to a bit. The abutting assembly is movably provided at a position on an outer periphery of the second end of the attaching sleeve, so that it can abut against the attaching shaft in a radial direction or move away from the attaching sleeve to loosen the attaching shaft, and with the buffer assembly, mitigate the impact force of the structure to be locked when the bolt is installed.

14 Claims, 2 Drawing Sheets

(58) Field of Classification Search
USPC ........ 173/81, 90, 140–141, 162.1, 197, 198, 173/213, 168–171
See application file for complete search history.

(56) References Cited

U.S. PATENT DOCUMENTS

| | | | | | |
|---|---|---|---|---|---|
| 3,937,036 | A * | 2/1976 | Sauerwein | F16D 7/08 | 464/36 |
| 4,402,626 | A * | 9/1983 | Recker | F16D 1/116 | 403/328 |
| 5,576,501 | A * | 11/1996 | Huang | B25B 13/463 | 81/473 |
| 6,463,824 | B1 * | 10/2002 | Prell | B25F 3/00 | 173/29 |
| 6,644,702 | B2 * | 11/2003 | Liou | B25G 3/36 | 403/322.2 |
| 7,690,658 | B2 * | 4/2010 | Puzio | B23B 31/1253 | 279/134 |
| 8,109,183 | B2 * | 2/2012 | Santamarina | B25B 23/1405 | 81/477 |
| 8,636,081 | B2 * | 1/2014 | Ludy | B25D 11/005 | 173/217 |
| 10,434,636 | B2 * | 10/2019 | Wang | B25G 1/085 | |
| 2002/0035876 | A1 * | 3/2002 | Donaldson, Jr. | B25B 23/1456 | 73/862.21 |
| 2005/0051596 | A1 * | 3/2005 | Estes | B25B 31/00 | 227/139 |
| 2005/0235779 | A1 * | 10/2005 | Haytayan | B25B 23/045 | 81/52 |
| 2009/0314143 | A1 | 12/2009 | Chen | | |
| 2010/0084451 | A1 * | 4/2010 | Abla | B25C 1/00 | 227/107 |
| 2011/0186316 | A1 * | 8/2011 | Barhitte | B25F 5/00 | 173/29 |
| 2012/0090863 | A1 * | 4/2012 | Puzio | B25B 21/002 | 173/2 |
| 2015/0053449 | A1 * | 2/2015 | Henke | E01B 29/26 | 173/128 |
| 2015/0343583 | A1 * | 12/2015 | McRoberts | B23Q 5/045 | 173/213 |
| 2016/0318165 | A1 * | 11/2016 | Thorson | B25B 23/141 | |
| 2020/0009709 | A1 * | 1/2020 | Kumagai | B25B 21/02 | |
| 2021/0023629 | A1 * | 1/2021 | Kawai | B25D 16/00 | |
| 2023/0202017 | A1 * | 6/2023 | Sabic | B25F 3/00 | 173/217 |
| 2025/0033172 | A1 * | 1/2025 | Hallberg | B25F 1/04 | |

FOREIGN PATENT DOCUMENTS

| | | | | | |
|---|---|---|---|---|---|
| DE | 102018110718 | B4 * | 10/2020 | B25B 23/0035 |
| EP | 1181135 | B1 * | 9/2004 | B25B 15/001 |
| EP | 1260319 | B1 * | 12/2007 | B25B 15/001 |
| EP | 3978192 | A1 * | 4/2022 | B25B 21/02 |
| GB | 2403176 | A * | 12/2004 | B25D 17/088 |
| JP | 2007054934 | A * | 3/2007 | |
| JP | 4607134 | B2 * | 1/2011 | |
| TW | M364582 | U * | 9/2009 | |
| TW | I635933 | B * | 9/2018 | |
| WO | WO-2004007858 | A2 * | 1/2004 | B25B 21/002 |
| WO | WO-2007120893 | A2 * | 10/2007 | B25B 23/0035 |
| WO | WO-2014040980 | A1 * | 3/2014 | B23B 31/1071 |

OTHER PUBLICATIONS

Atlas Copco Industrial Technique AB, International Patent Application No. PCT/EP2021/062021, International Search Report, Aug. 17, 2021.

Atlas Copco Industrial Technique AB, International Patent Application No. PCT/EP2021/062021, Written Opinion, Aug. 17, 2021.

* cited by examiner

BIT ATTACHMENT DEVICE AND TIGHTENING MODULE

CROSS-REFERENCE TO RELATED APPLICATIONS

This application is a National Stage Patent Application (filed under 35 § U.S.C. 371) of PCT/EP2021/062021, filed May 6, 2021, of the same title, which, in turn claims priority to Chinese Patent Application No. 202020733213.6 filed May 7, 2020, of the same title; the contents of each of which are hereby incorporated by reference.

FIELD OF THE INVENTION

The utility model relates to the technical field of an automatic bolt tightening device, in particular to a bit attachment device and a tightening module.

BACKGROUND OF THE INVENTION

At present, the production process of a product in electronic assembly, hardware fitting, automotive and other industries includes a bolt locking process. Traditionally, the bolt locking is done by pure manual operation, which is not only time consuming but also extremely inefficient. Instead of manual tightening of bolts, a tightening module has been developed that can lock bolts by means of a bit attachment device and a cylinder that drives the bit to rotate and advance so as to achieve the purpose of locking bolts.

However, the bit attachment device of the existing tightening module has the following defects.

During locking bolts, since the impact force provided by the cylinder of the tightening module is large, parts connected by bolts are prone to damage, and it is difficult for a disassembling-attaching assembly mounted with the bit to maintain a firmly installed state while ensuring the ease of disassembly and assembly, which can easily lead to safety accidents in case of loose installation.

SUMMARY OF THE INVENTION

In view of the above-mentioned technical problems in the prior art, the present utility model provides a bit attachment device and a tightening module, which can effectively reduce the impact force generated on a product to be locked when locking a bolt, and at the same time of which a disassembling-attaching assembly and an attaching shaft are firmly and reliably connected by a spline structure.

The embodiment of the present utility model provides a bit attachment device, which is applied to a tightening module, comprising an attaching sleeve, a disassembling-attaching assembly and an abutting assembly arranged in sequence; wherein:

- a first end of the attaching sleeve is attached to a movable rod within the tightening module via a buffer assembly, so as to synchronize with movement of the movable rod;
- the disassembling-attaching assembly includes an attaching shaft whose first end forms a tight fit with a second end of the attaching sleeve via a spline structure, and the second end of the attaching shaft is attached to a bit;
- the abutting assembly is movably provided at a position located on an outer periphery of the second end of the attaching sleeve, so that it can abut against the attaching shaft in a radial direction, or move toward a direction away from the attaching sleeve to loosen the attaching shaft.

In some embodiments, the first end of the attaching sleeve is connected to the movable rod within the tightening module, is synchronized with circumferential and axial movements of the movable rod, and is sleeved with the buffer assembly for mitigating the impact force generated when the movable rod moves toward the direction of the attaching sleeve, and the second end of the attaching sleeve is formed with an internal spline;

- the second end of the attaching sleeve is sleeved on the first end of the attaching shaft, and an external spline matched with the internal spline is formed on the side of the attaching shaft close to the first end thereof.

In some embodiments, the buffer assembly includes a spring for abutting against the movable rod and a spring sleeve;

- one end of the spring sleeve is open to install the spring, and the other end thereof abuts against the first end of the attaching shaft.

In some embodiments, the abutting assembly includes an operating member and an abutting member, and the operating member is slidably provided on the outer periphery of the second end of the attaching sleeve; by sliding the operating member, an operating surface of the operating member acts on the abutting member, so that the abutting member become close to or away from the attaching shaft.

In some embodiments, the second end of the attaching sleeve is circumferentially provided with a plurality of through slots;

- the operating member includes a slide sleeve slidingly sleeved at the second end of the attaching sleeve;
- the abutting member includes balls capable of being embedded in the through-slots, and an operating surface of the slide sleeve toward the balls is configured as a step surface for the balls to roll on the step surface to move close to or away from the attaching shaft.

In some embodiments, the operating surface of the slide sleeve expands outwardly from its abutting place against the balls toward the direction of the attaching sleeve, and forms an expansion cavity with the outer surface of the attaching sleeve, so that when the slide sleeve moves toward the direction away from the attaching sleeve, the balls roll into the expansion cavity to release the abutment against the attaching shaft.

In some embodiments, the abutting assembly further includes a reset member sleeved on the attaching sleeve, a reset cavity is formed between the slide sleeve and the attaching sleeve for accommodating the reset member, and the reset member is used to exert an acting force to the slide sleeve to reset it toward a direction close to the attaching sleeve.

In some embodiments, the first end of the attaching shaft is circumferentially provided with an annular groove, and a portion of the ball is located within the annular groove.

In some embodiments, the disassembling-attaching assembly further includes a bit sleeve sleeved on the bit, and the second end of the attaching shaft is connected with the bit via the bit sleeve.

The present utility model also provides a tightening module, including a bit attachment device described above, and the tightening module further includes a drive assembly and a movable rod capable of moving circumferentially and axially under the action of the drive assembly.

Compared with the prior art, the beneficial effects of the embodiments of the present utility model are: in the bit attachment device of the embodiment of the present utility model, the attaching sleeve is connected with the movable rod in the tightening module via the buffer assembly, which can not only reduce the impact force on the structure to be locked when installing the bolt so as to reduce damage to the structure to be locked, but also exert an abutting force to the disassembling-attaching assembly so that the bit on the disassembling-attaching assembly can be stably abutted at the forefront so as to achieve the purpose of optimizing the usability of the tightening module adopting the bit attachment device. Moreover, the disassembling-attaching assembly connected with the bit and the attaching sleeve are connected by the spline structure, which enables the disassembling-attaching assembly to ensure the ease of disassembly and assembly while also being able to maintain a firmly installed state when the tightening module is in use, so as to improve the safety and stability of the bit attachment device. In addition, with the above-mentioned buffer assembly, the acting force exerted by the bit attachment device to the bolt is the force generated after being buffered by the buffer assembly instead of the impact force generated by the cylinder of the drive assembly of the tightening module. Moreover, the buffer assembly can facilitate the disassembly of the disassembling-attaching assembly through the force it exerts on the disassembling-attaching assembly and play an auxiliary disassembly function, which is convenient for users to use. The above-mentioned bit attachment device has a compact structure and an ingenious design, and involves a small number of parts, which is beneficial to reduce production cost.

BRIEF DESCRIPTION OF THE DRAWINGS

In figures that are not necessarily drawn to scale, the same reference signs may describe similar components in different figures. The same reference signs with suffixes or different suffixes may denote different examples of similar components. The figures generally show various embodiments by way of example rather than limitation, and are used together with the description and claims to describe the embodiments of the utility model. When appropriate, the same reference signs are used in all figures to refer to the same or similar parts. Such embodiments are illustrative, and are not intended to be exhaustive or exclusive embodiments of the present device or method.

The components indicated by the reference signs in the figures:

100—tightening module; 200—bit attachment device; 300—drive assembly; 1—attaching sleeve; 2—disassembling-attaching assembly; 21—attaching shaft; 22—annular groove; 3—abutting assembly; 31—operating member; 32—abutting member; 33—step surface; 34—reset member; 35—sliding sleeve; 36—ball; 4—buffer assembly; 41—spring; 42—spring sleeve; 5—movable rod; 6—bit; 7—bit sleeve.

DETAILED DESCRIPTION OF EMBODIMENTS

In order to enable those skilled in the art to better understand the technical solutions of the present utility model, the present utility model will be described in detail below in conjunction with the accompanying drawings and specific embodiments. The embodiments of the present utility model will be described in further detail below in conjunction with the accompanying drawings and specific embodiments, but they are not intended to limit the present utility model.

"First", "second" and similar words used in the present utility model do not indicate any order, quantity or importance, but are only used to distinguish different components. "Include" or "comprise" and other similar words means that an element appearing before this word covers an element listed after this word, but does not exclude other elements. "Up", "down", "left", "right", etc. are only used to indicate the relative position relationship. When the absolute position of a described object changes, the relative position relationship may also change accordingly.

In the present utility model, when it is described that a specific device is located between the first device and the second device, there may or may not be an interposed device between the specific device and the first device or the second device. When it is described that a specific device is connected to another device, the specific device may be directly connected to the another device without an interposed device, or may not be directly connected to the another device but with an interposed device.

All terms (including technical terms or scientific terms) used in this utility model have the same meaning as understood by those of ordinary skill in the art to which this utility model belongs, unless otherwise specifically defined. It should also be understood that terms such as those defined in general-purpose dictionaries should be interpreted as having meanings consistent with their meanings in the context of related technologies, and should not be interpreted in an idealized or extremely formal sense unless it is clearly defined as such herein.

The technologies, methods, and devices known to those of ordinary skill in the relevant fields may not be discussed in detail, but where appropriate, the technologies, methods, and devices should be regarded as a part of the specification.

Figure 1:
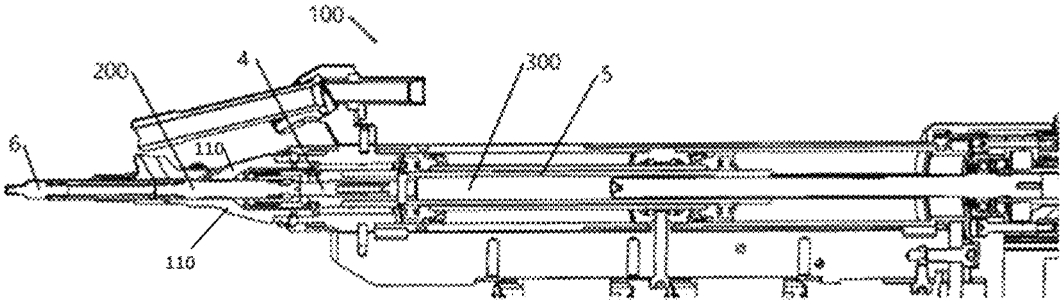
FIG. 1 is a schematic diagram of a structure of a tightening module including a bit attachment device in the embodiment of the present utility model.
Figure 2:
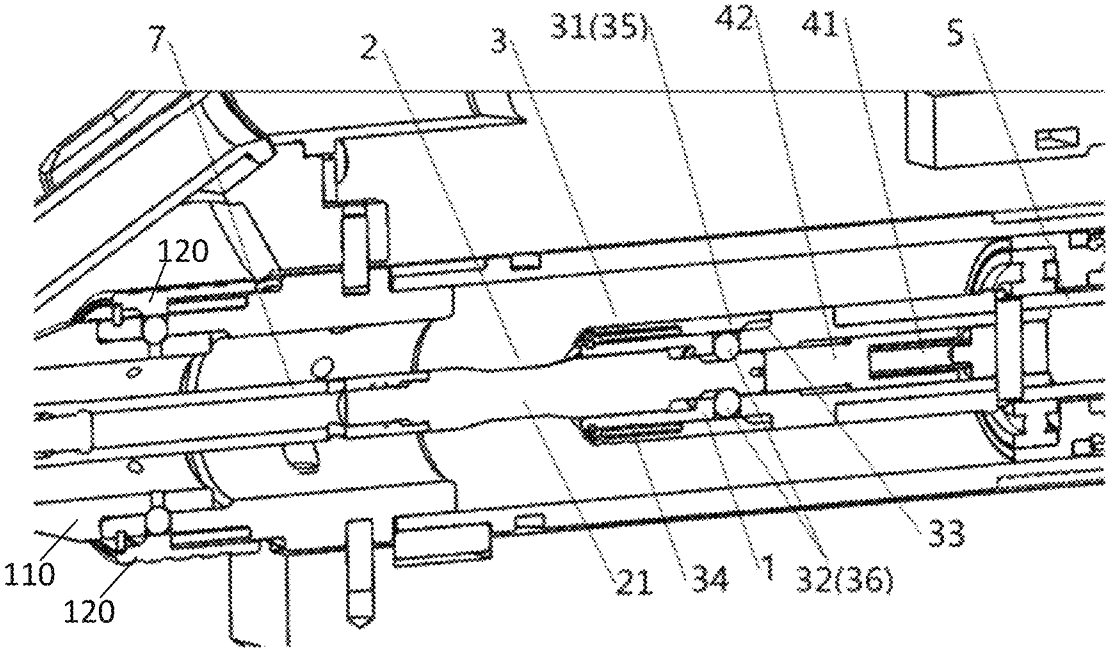
FIG. 2 is a schematic diagram of the partial structure of the bit attachment device of the embodiment of the present utility model, in which a disassembling-attaching assembly is in an undisassembled state.

The embodiment of the present utility model provides a bit attachment device 200, which is applied to a tightening module 100. As shown in FIG. 1, instead of manually tightening bolts in the prior art, the tightening module 100 is used to tighten the bolts to a structure to be locked, that is, the above-mentioned tightening module 100 can drive a bit 6 to rotate while pushing the bit 6 outward to lock the bolt. The bit attachment device 200 includes an attaching sleeve 1, a disassembling-attaching assembly 2 and an abutting assembly 3 arranged in sequence (as shown in FIGS. 1 and 2). A first end of the attaching sleeve 1 is attached to a movable rod 5 in the tightening module 100 via a buffer assembly 4 to synchronize with the movement of the movable rod 5. The disassembling-attaching assembly 2 includes an attaching shaft 21 whose first end forms a tight fit with a second end of the attaching sleeve 1 via a spline structure and second end is attached to the bit 6. The abutting assembly 3 is movably provided at a position located on an outer periphery of the second end of the attaching sleeve 1, so that it can abut against the attaching shaft 21 in a radial direction or move away from the attaching sleeve 1 to loosen the attaching shaft 21. A bit housing 110 comprises a tapered end configured to radially abut the attaching shaft 21 of the disassembling-attaching assembly 2. The bit housing 110 is removably attached to the bit attachment device 200 via a disconnect 120.

It will be appreciated that the movable rod 5 in the tightening module 100 can drive the bit 6 to rotate and move axially, and can be driven by a cylinder or other drive assembly 300, which is not specifically limited by the present application, as long as the movable rod 5 can drive the bit 6 to rotate and move axially.

It will be appreciated that the above-mentioned buffer assembly 4 can exert a force to the disassembling-attaching assembly 2 to keep it away from the bit attachment device 200, such that when the bolts are installed, the impact force of the tightening module 100 on the structure to be locked is mitigated, and when the bit 6 needs to be replaced, the force is beneficial to the disassembly of the disassembling-attaching assembly 2.

It will be appreciated that the second end of the above-mentioned attaching sleeve 1 is sleeved on the first end of the attaching shaft 21. As shown in FIG. 2, the first end of the attaching shaft 21 is an end close to the attaching sleeve 1, and the first end of the attaching sleeve 1 is an end away from the attaching shaft 21. The attaching shaft 21 and the attaching sleeve 1 form a tight fit via the spline structure, so that a stable connection between the attaching shaft 21 and the attaching sleeve 1 can be realized when a user uses the bit attachment device 200 so as to improve operation safety, and when the user intends to disassemble the disassembling-attaching assembly 2 to replace the bit 6, the disassembling-attaching assembly 2 can be disassembled by loosening tightness of the abutting assembly 3 to the attaching shaft 21 and rotating the attaching shaft 21 to move it away from the attaching sleeve 1 so as to replace the bit 6 connected with the disassembling-attaching assembly 2. It can be seen that the above-mentioned structure can not only ensure the operation safety of the product, but also facilitate the user to replace the bit 6.

Figure 3:
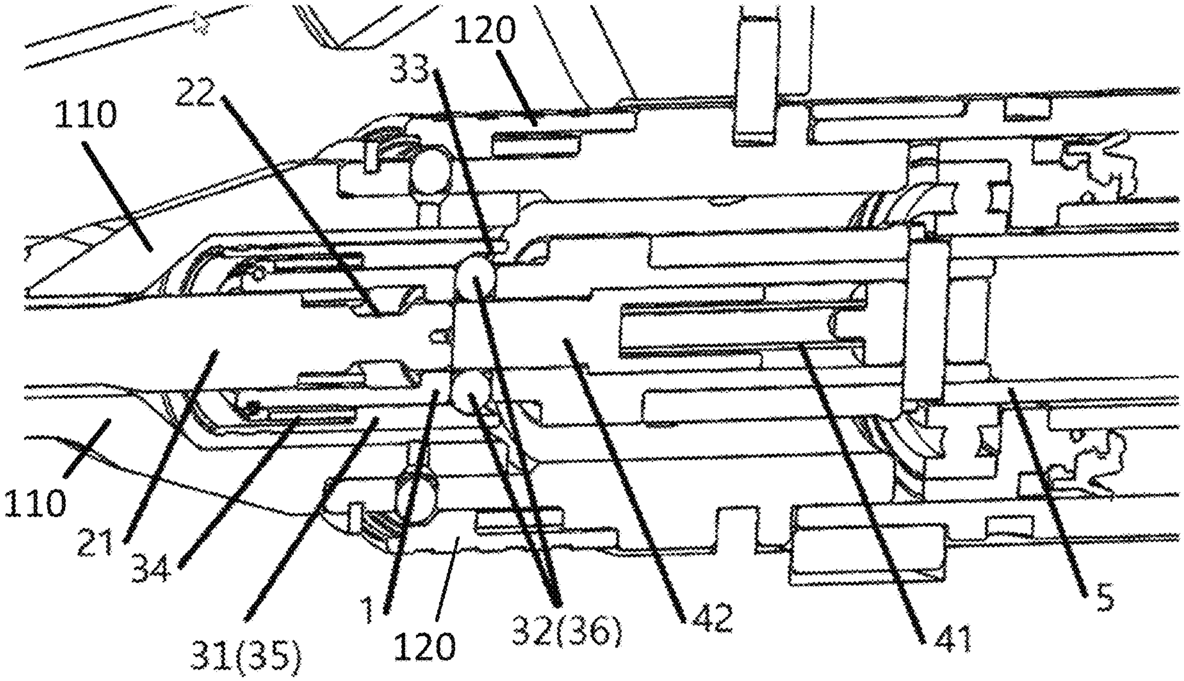
FIG. 3 is a schematic diagram of another partial structure of the bit attachment device of the embodiment of the present utility model, in which the disassembling-attaching assembly is in a disassembled state.

It will be appreciated that the abutting assembly 3 exerts an abutting force in the radial direction of the attaching shaft 21, so that the structure of the bit attachment device 200 within the tightening module 100 in the working state is stable and reliable, and the attaching shaft 21 can be stably connected to the attaching sleeve 1. When the abutting assembly 3 moves in the direction away from the attaching sleeve 1, that is, when the disassembling-attaching assembly 2 changes from an undisassembled state (as shown in FIG. 2) to a disassembled state (as shown in FIG. 3), the abutting assembly 3 moves to the left in its axial direction (i.e., the direction in which the disassembling-attaching assembly 2 is located as shown in FIGS. 2 and 3), and will loosen the abutment of the abutting assembly 3 against the attaching shaft 21, such that the attaching shaft 21 can be disengaged from the attaching sleeve 1 by rotating, therefore replacing the bit 6 connected with the disassembling-attaching assembly 2.

In the bit attachment device 200 of the embodiment of the present utility model, the attaching sleeve 1 is connected with a movable rod 5 in the tightening module 100 via the buffer assembly 4, which can not only reduce the impact force on the structure to be locked when installing the bolt so as to reduce damage to the structure to be locked, but also exert an abutting force to the disassembling-attaching assembly 2 so that the bit 6 on the disassembling-attaching assembly 2 can be stably abutted at the forefront so as to achieve the purpose of optimizing the usability of the tightening module 100 adopting the bit attachment device 200. Moreover, the disassembling-attaching assembly 2 connected with the bit 6 and the attaching sleeve 1 are connected by the spline structure, which enables the disassembling-attaching assembly 2 to ensure the ease of disassembly and assembly while also being able to maintain a firmly installed state when the tightening module 100 is in use, so as to improve the safety and stability of the bit attachment device 200. In addition, with the above-mentioned buffer assembly 4, the acting force exerted by the bit attachment device 200 to the bolt is the force generated after being buffered by the buffer assembly 4 instead of the impact force generated by the cylinder of the drive assembly 300 of the tightening module 100. Moreover, the buffer assembly 4 can facilitate the disassembly of the disassembling-attaching assembly 2 through the force it exerts on the disassembling-attaching assembly 2 and play an auxiliary disassembly function, which is convenient for users to use. The above-mentioned bit attachment device 200 has a compact structure and an ingenious design, and involves a small number of parts, which is beneficial to reduce production cost.

In some embodiments, the first end of the attaching sleeve 1 is connected to the movable rod 5 (as shown in FIG. 2) within the tightening module 100, is synchronized with circumferential and axial movements of the movable rod 5, and is sleeved with the buffer assembly 4 for mitigating the impact force generated when the movable rod 5 moves toward the direction of the attaching sleeve 1, and a second end of the attaching sleeve 1 is formed with an internal spline therein; the second end of the attaching sleeve 1 is sleeved on the first end of the attaching shaft 21, and an external spline matched with the internal spline is formed on the side of the attaching shaft 21 close to the first end thereof. As shown in FIG. 2, the buffer assembly 4 located within the attaching sleeve 1 can abut against the first end of the attaching shaft 21, so that when the tightening module 100 is used to install the bolts, the attaching shaft 21 can abut against the attaching sleeve 1, thereby improving operation safety of the product.

In some embodiments, the buffer assembly 4 includes a spring 41 for abutting against the movable rod 5 and a spring sleeve 42 sleeved on the spring 41. As shown in FIGS. 2 and 3, one end of the spring sleeve 42 is open to install the spring 41, and the other end thereof abuts against the first end of the attaching shaft 21. Through the abutment between the spring sleeve 42 and the attaching shaft 21, the contact area of the buffer assembly 4 and the attaching shaft 21 can be increased, so that the acting force generated by the spring 41 within the spring sleeve 42 can be stably exerted to the attaching shaft 21. The disassembling-attaching assembly shown in FIG. 3 is in a disassembled state. When the disassembling-attaching assembly 2 is disassembled, the spring sleeve 42 moves and extends toward the direction of the disassembling-attaching assembly 2 under the acting force of the spring 41, so that the spring sleeve 42 facilitates the disassembly of the disassembling-attaching assembly 2 under this acting force and at this time the spring sleeve 42 can maintain an extended state under the action of the spring 41, and the abutting member 32 rolls to one end of the spring sleeve 42 near the disassembling-attaching assembly 2 so that the abutting member 32 is stably placed between the operating member 31 and the spring sleeve 42. The above-mentioned structure facilitates the disassembling-attaching assembly 2 to be reinserted back into the attaching sleeve 1.

In some embodiments, the abutting assembly 3 includes the operating member 31 and the abutting member 32. As shown in FIGS. 2 and 3, the operating member 31 is slidably provided on the outer periphery of the second end of the attaching sleeve 1, can slide by the user's grip, and can be provided with a concave and convex pattern for increasing friction at the outer side thereof. By sliding the operating member 31, the operating surface thereof acts on the abutting member 32, so that the abutting member 32 become close to or away from the attaching shaft 21.

It will be appreciated that the above-mentioned operating surface of the operating member 31 is its surface close to the abutting member 32. The disassembling-attaching assembly 2 shown in FIG. 2 is in an undisassembled state, and the operating surface of the operating member 31 abuts against the attaching shaft 21 via the abutting member 32 so that the connection between the attaching shaft 21 and the attaching sleeve 1 is stable. The disassembling-attaching assembly 2 shown in FIG. 3 is in a state of being disassembled, and after the operating member 31 slides in the direction away from the attaching sleeve 1, the abutting member 32 will move away from the attaching shaft 21 to loosen the abutment against the attaching shaft 21, so that the disassembling-attaching assembly 2 can be disassembled by rotating the attaching shaft 21.

In some embodiments, the second end of the attaching sleeve 1 is circumferentially provided with a plurality of through slots (not shown in the figures). The operating member 31 includes a slide sleeve 35 slidingly provided at the second end of the attaching sleeve 1; the abutting member 32 includes balls 36 capable of being embedded in the through-slots, that is, an inner wall of the slide sleeve 35 abuts against the balls 36 in the through-slots to achieve abutment against the attaching shaft 21 by the balls 36. The operating surface of the slide sleeve 35 toward the balls 36 is configured as a step surface 33 (as shown in FIGS. 2 and 3) for the balls 36 to roll on the step surface 33 to move close to or away from the attaching shaft 21, wherein the operating surface of the slide sleeve 35 can be understood as a curved surface formed by the inner wall of the slide sleeve 35.

In some embodiments, the operating surface of the slide sleeve 35 expands outwardly from its abutting place against the balls 36 toward the direction of the attaching sleeve 1, and forms an expansion cavity with the outer surface of the attaching sleeve 1, so that when the slide sleeve 35 moves toward the direction away from the attaching sleeve 1, the balls 36 roll into the expansion cavity, thereby releasing the abutment against the attaching shaft 21.

It will be appreciated that when the slide sleeve 35 moves toward the direction away from the attaching sleeve 1, the balls 36 will roll into the above-mentioned expansion cavity, thereby releasing the abutment against the attaching shaft 21, as shown in FIG. 3; at the same time, the spring sleeve 42 of the buffer assembly 4 will move toward the direction of the disassembling-attaching assembly 2 under the action of the spring 41, and one side of the above-mentioned ball 36 will abut against the outer wall of the spring sleeve 42 while the other side thereof will abut against the operating surface of the slide sleeve 35 (as shown in FIG. 3), therefore avoiding the ball 36 from slipping off and realizing that when it is necessary to install the disassembling-attaching assembly 2 into the attaching sleeve 1, the ball 36 can roll toward and abut against the attaching shaft 21 so as to abut against the attaching shaft 21.

In some embodiments, the abutting assembly 3 further includes a reset member 34 sleeved on the attaching sleeve 1, as shown in FIGS. 2 and 3; a reset cavity is formed between the slide sleeve 35 and the attaching sleeve 1 for accommodating the reset member 34, and the reset member 34 is used to exert an acting force (e.g., a spring force) to the slide sleeve 35 to reset it toward a direction close to the attaching sleeve 1, so that when the acting force exerted to the slide sleeve 35 is released, the slide sleeve 35 can be automatically reset by the reset member 34. In some embodiments, the reset member 34 may comprise a spring.

In some embodiments, the first end of the attaching shaft 21 is circumferentially provided with an annular groove 22, as shown in FIG. 3, and a portion of the ball 36 is located within the annular groove 22 to enable the ball 36 to stably and reliably abut against the attaching shaft 21.

In some embodiments, the disassembling-attaching assembly 2 further includes a bit sleeve 7 sleeved on the bit 6, and the second end of the attaching shaft 21 is connected with the bit 6 via the bit sleeve 7. The above-mentioned bit sleeve 7 can include a variety of bit sleeves 7 in different sizes to adapt to the bit 6 in different sizes. Due to the high manufacturing cost of the spline structure on the attaching shaft 21, by providing the above-mentioned bit sleeve 7, the user only needs to replace the bit sleeve 7 adapted to the bit 6 without replacing the attaching shaft 21 when intending to replace the bit 6, thereby reducing production cost.

The embodiment of the present utility model also provides a tightening module 100. As shown in FIG. 1, the tightening module 100 includes the above-mentioned bit attachment device 200, and the tightening module 100 further includes a drive assembly 300 and a movable rod 5 capable of moving circumferentially and axially under the action of the drive assembly 300. With the above-mentioned bit attachment device 200, the impact force on the structure to be locked when installing the bolt via the tightening module 100 can be mitigated; moreover, with the above-mentioned buffer assembly 4, the acting force exerted by the bit attachment device 200 to the bolt is the force generated after being buffered by the buffer assembly 4 instead of the impact force generated by the cylinder of the drive assembly 300 of the tightening module 100. For example, the shape of the hole in the bolt may be hexagonal or inner star, and the bit 6 must be adapted to the shape of the hole in the bolt; or when the head of the bolt is hexagonal or plum, the bit 6 is a sleeve type bit adapted to the bolt. The type of the above-mentioned bit 6 is for example only, and the application does not limit the type of bit 6 that fits the bolt, as long as the bite 6 can fit the bolt for tightening. When the acting force exerted by the buffer assembly 4 pushes the bit 6, it is convenient to connect the bit 6 and the bolt. If the bit 6 is pushed by the impact force exerted by the cylinder of the drive assembly 300, the bit 6 may not engage with the holes on the bolts. And the buffer assembly 4 can use the acting force applied to the disassembly assembly 2 to facilitate the disassembly of the disassembling-attaching assembly 2 and play an auxiliary disassembly function. In addition, the disassembling-attaching assembly 2 connected with the bit 6 and the attaching sleeve 1 are connected by the spline structure, which enables the disassembling-attaching assembly 2 to maintain a firmly installed state when the tightening module 100 is in use while ensuring the ease of disassembly and assembly so as to improve safety and stability of the tightening device 100.

The above-mentioned structure design has the advantages such as small size, light weight and compact structure, wherein the lower weight is an important factor for the user to hold, and the compact structure can reduce the size, that is, when the shape of the tightening module 100 is cylindrical, the above-mentioned structure can reduce the diameter of the tightening module 100, which is an important performance of the tightening module 100 in the application.

In addition, although exemplary embodiments have been described herein, the scope thereof includes any and all embodiments based on the present utility model having equivalent elements, modifications, omissions, combinations (e.g., scenarios where various embodiments intersect), adaptations, or changes. The elements of the claims will be construed broadly based on the language employed in the claims and are not limited to the examples described in this specification or during implementation of this application, the examples of which will be construed as non-exclusive. Accordingly, this specification and the examples are intended to be considered as examples only, and the true scope and spirit are indicated by the full scope of the following claims and their equivalents.

The above-mentioned description is intended to be illustrative and not limiting. For example, the above-mentioned examples (or one or more embodiments thereof) may be used in combination with each other. For example, those of ordinary skill in the art may use other embodiments when reading the above-mentioned description. In addition, in the above-mentioned specific embodiments, various features may be grouped together to simplify the present utility model. This should not be interpreted as an intent that features of the disclosure that do not require protection are necessary for any of the claims. Rather, the subject matter of the present utility model may be less than the full range of features of a particular disclosed embodiment. Thereby, the following claims are incorporated herein as examples or embodiments in the particular embodiment, wherein each claim stands alone as a separate embodiment, and it is contemplated that these embodiments may be combined with each other in various combinations or permutations. The scope of the present utility model shall be determined by reference to the full scope of the appended claims and equivalent forms of these claim assignments.

The above-mentioned embodiments are only exemplary embodiments of the present utility model, and are not used to limit the present utility model. The scope of protection of the utility model is defined by the claims. Those skilled in the art can make various modifications or equivalent substitutions to the utility model within the essence and protection scope of the utility model, and such modifications or equivalent substitutions should also be regarded as falling within the protection scope of the utility model.

The invention claimed is:

1. A bit attachment device, which is applied to a tightening module, the bit attachment device comprising an attaching sleeve, a disassembling-attaching assembly and an abutting assembly arranged in sequence, wherein:

a first end of the attaching sleeve is coupled to a movable rod within the tightening module via a buffer assembly, so as to move with rotational and axial movements of the movable rod;

the disassembling-attaching assembly includes an attaching shaft whose first end forms a tight fit with a second end of the attaching sleeve via a spline structure, and a second end of the attaching shaft configured for attachment to a bit;

the abutting assembly is movably provided at a position located on an outer periphery of the second end of the attaching sleeve, so that said abutting assembly can abut against the attaching shaft in a radial direction, or move toward a direction away from the attaching sleeve to loosen the attaching shaft, wherein:

the first end of the attaching sleeve is sleeved with the buffer assembly for mitigating an impact force generated when the movable rod moves toward the direction of the attaching sleeve, and the second end of the attaching sleeve is formed with an internal spline;

the second end of the attaching sleeve is sleeved on the first end of the attaching shaft, and an external spline matched with the internal spline of the attaching sleeve is formed on the side of the attaching shaft close to the first end thereof;

the buffer assembly includes a spring for abutting against the movable rod and a spring sleeve; and one end of the spring sleeve is open to install the spring, and the other end thereof abuts against the first end of the attaching shaft.

2. The bit attachment device according to claim 1, wherein the abutting assembly includes an operating member and an abutting member, and the operating member is slidably provided on the outer periphery of the second end of the attaching sleeve; by sliding the operating member, an operating surface of the operating member acts on the abutting member, so that the abutting member becomes close to or away from the attaching shaft.

3. The bit attachment device according to claim 2, wherein:

the second end of the attaching sleeve is circumferentially provided with a plurality of through slots;

the operating member includes a slide sleeve slidingly sleeved at the second end of the attaching sleeve; and the abutting member includes balls capable of being embedded in the through-slots, and an operating surface of the slide sleeve toward the balls is configured as a step surface for the balls to roll on the step surface to move close to or away from the attaching shaft.

4. The bit attachment device according to claim 3, wherein the operating surface of the slide sleeve expands outwardly from its abutting place against the balls toward the direction of the attaching sleeve and forms an expansion cavity with the outer surface of the attaching sleeve, so that when the slide sleeve moves toward the direction away from the attaching sleeve, the balls roll into the expansion cavity to release the abutment against the attaching shaft.

5. The bit attachment device according to claim 3, wherein the abutting assembly further includes a reset member sleeved on the attaching sleeve, a reset cavity is formed between the slide sleeve and the attaching sleeve for accommodating the reset member, and the reset member is used to exert an acting force to the slide sleeve to reset it toward a direction close to the attaching sleeve.

6. The bit attachment device according to claim 3, wherein the first end of the attaching shaft is circumferentially provided with an annular groove, and a portion of one of the balls is located within the annular groove.

7. The bit attachment device according to claim 1, wherein the disassembling-attaching assembly further includes a bit sleeve sleeved on the bit, and the second end of the attaching shaft is connected with the bit via the bit sleeve.

8. A tightening module comprising:

a drive assembly;

a movable rod capable of moving rotationally and axially under the action of the drive assembly; and a bit attachment device comprising an attaching sleeve, a disassembling-attaching assembly and an abutting assembly arranged in sequence, wherein:

a first end of the attaching sleeve is coupled to a movable rod within the tightening module via a buffer assembly, so as to move with rotational and axial movements of the movable rod;

the disassembling-attaching assembly includes an attaching shaft whose first end forms a tight fit with a second end of the attaching sleeve via a spline structure, and a second end of the attaching shaft configured for attachment to a bit;

the abutting assembly is movably provided at a position located on an outer periphery of the second end of the attaching sleeve, so that said abutting assembly-it can abut against the attaching shaft in a radial direction, or move toward a direction away from the attaching sleeve to loosen the attaching shaft;

the first end of the attaching sleeve is sleeved with the buffer assembly for mitigating an impact force generated when the movable rod moves toward the direction of the attaching sleeve, and the second end of the attaching sleeve is formed with an internal spline;

the second end of the attaching sleeve is sleeved on the first end of the attaching shaft, and an external spline matched with the internal spline of the attaching sleeve is formed on the side of the attaching shaft close to the first end thereof;

the buffer assembly includes a spring for abutting against the movable rod and a spring sleeve; and one end of the spring sleeve is open to install the spring, and the other end thereof abuts against the first end of the attaching shaft.

9. The tightening module according to claim 8, wherein the abutting assembly includes an operating member and an abutting member, and the operating member is slidably provided on the outer periphery of the second end of the attaching sleeve; by application of an axial force, an operating surface of the operating member acts on the abutting member, so that the abutting member becomes close to or away from the attaching shaft.

10. The tightening module according to claim 9, wherein:

the second end of the attaching sleeve is circumferentially provided with a plurality of through slots;

the operating member includes a slide sleeve slidingly sleeved at the second end of the attaching sleeve; and the abutting member includes balls capable of being embedded in the through-slots, and an operating surface of the slide sleeve toward the balls is configured as a step surface for the balls to roll on the step surface to move close to or away from the attaching shaft.

11. The tightening module according to claim 10, wherein the operating surface of the slide sleeve expands outwardly from its abutting place against the balls toward the direction of the attaching sleeve and forms an expansion cavity with the outer surface of the attaching sleeve, so that when the slide sleeve moves toward the direction away from the attaching sleeve, the balls roll into the expansion cavity to release the abutment against the attaching shaft.

12. The tightening module according to claim 10, wherein the abutting assembly further includes a reset member sleeved on the attaching sleeve, a reset cavity is formed between the slide sleeve and the attaching sleeve for accommodating the reset member, and the reset member is used to exert an acting force to the slide sleeve to reset it toward a direction close to the attaching sleeve.

13. The tightening module according to claim 10, wherein the first end of the attaching shaft is circumferentially provided with an annular groove, and a portion of the one of the balls is located within the annular groove.

14. The tightening module according to claim 8, wherein the disassembling-attaching assembly further includes a bit sleeve sleeved on the bit, and the second end of the attaching shaft is connected with the bit via the bit sleeve.

* * * * *